United States Patent
Lee et al.

(10) Patent No.: US 11,312,856 B2
(45) Date of Patent: Apr. 26, 2022

(54) BLOCK COPOLYMER COMPOSITION

(71) Applicant: LG Chem, Ltd., Seoul (KR)

(72) Inventors: Hyun Mo Lee, Daejeon (KR); Eun Ji Shin, Daejeon (KR); Seok Pil Sa, Daejeon (KR); Yoon Ki Hong, Daejeon (KR); Ki Soo Lee, Daejeon (KR); Bun Yeoul Lee, Gyeonggi-do (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 16/977,321

(22) PCT Filed: Mar. 29, 2019

(86) PCT No.: PCT/KR2019/003751
§ 371 (c)(1),
(2) Date: Sep. 1, 2020

(87) PCT Pub. No.: WO2019/190289
PCT Pub. Date: Oct. 3, 2019

(65) Prior Publication Data
US 2021/0002473 A1 Jan. 7, 2021

(30) Foreign Application Priority Data

Mar. 30, 2018 (KR) .................. 10-2018-0037549
Oct. 2, 2018 (KR) .................. 10-2018-0117839

(51) Int. Cl.
*C08L 53/00* (2006.01)
*C08F 293/00* (2006.01)
*C08F 4/44* (2006.01)
*C08F 10/14* (2006.01)
*C08F 297/02* (2006.01)
*C08L 25/06* (2006.01)
*C08L 25/08* (2006.01)
*C08F 210/14* (2006.01)
*C08F 212/08* (2006.01)
*C07F 3/06* (2006.01)

(52) U.S. Cl.
CPC .............. *C08L 53/00* (2013.01); *C07F 3/06* (2013.01); *C08F 4/44* (2013.01); *C08F 10/14* (2013.01); *C08F 210/14* (2013.01); *C08F 212/08* (2013.01); *C08F 293/00* (2013.01); *C08F 297/02* (2013.01); *C08L 25/06* (2013.01); *C08L 25/08* (2013.01); *C08L 2201/08* (2013.01)

(58) Field of Classification Search
CPC ... C08F 293/00; C08F 295/00; C08F 297/086
See application file for complete search history.

(56) References Cited

U.S. PATENT DOCUMENTS

| | | | |
|---|---|---|---|
| 5,618,883 A | 4/1997 | Plamthottam et al. | |
| 2005/0222356 A1 | 10/2005 | Joly et al. | |
| 2007/0078222 A1 | 4/2007 | Chang et al. | |
| 2008/0153970 A1 | 6/2008 | Salazar | |
| 2012/0077400 A1 | 3/2012 | Flood et al. | |
| 2013/0101767 A1 | 4/2013 | Wei | |
| 2015/0030933 A1 | 1/2015 | Goetzen et al. | |
| 2016/0101209 A1 | 4/2016 | Dubois | |
| 2018/0022852 A1 | 1/2018 | Lee et al. | |
| 2018/0030195 A1 | 2/2018 | Oshita et al. | |
| 2018/0187040 A1 | 7/2018 | Wan et al. | |
| 2020/0031978 A1 | 1/2020 | Lee et al. | |
| 2021/0002303 A1 | 1/2021 | Sa et al. | |
| 2021/0002473 A1 | 1/2021 | Lee et al. | |
| 2021/0017377 A1* | 1/2021 | Shin | C08F 297/083 |
| 2021/0108066 A1 | 4/2021 | Hong et al. | |

FOREIGN PATENT DOCUMENTS

| | | | |
|---|---|---|---|
| EP | 1470190 | A2 | 10/2004 |
| EP | 2042531 | A1 | 4/2009 |
| EP | 3257880 | A1 | 12/2017 |
| EP | 3590983 | A1 | 1/2020 |
| JP | 2005516099 | A | 6/2005 |
| JP | 2020512470 | A | 4/2020 |
| KR | 20160098968 | A | 8/2016 |
| KR | 101732418 | B1 | 5/2017 |
| KR | 101829382 | B1 | 2/2018 |
| WO | 2016127353 | A1 | 8/2016 |
| WO | 2018182174 | A1 | 10/2018 |

OTHER PUBLICATIONS

Chung et al., "A Novel Consecutive Chain Transfer Reaction to p-Methylstyrene and Hydrogen during Metallocene-Mediated Olefin Polymerization," Journal of the American Chemical Society, May 30, 2001, pp. 4871-4876, vol. 123, No. 21.
Dong et al., "Synthesis of Polyethylene Containing a Thermal p-Methylstyrene Group Metallocene-Mediated Ethylene Polymerization with a Consecutive Chain Transfer Reaction to p-Methylstyrene and Hydrogen," Macromolecules, Feb. 26, 2002, pp. 1622-1631, vol. 35, No. 5.
International Search Report for Application No. PCT/KR2019/003749 dated Jul. 10, 2019, 2 pages.
International Search Report for Application No. PCT/KR2019/003750 dated Jul. 10, 2019, 2 pages.

(Continued)

*Primary Examiner* — Jeffrey C Mullis
(74) *Attorney, Agent, or Firm* — Lerner, David, Littenberg, Krumholz & Mentlik, LLP

(57) ABSTRACT

A block copolymer composition is disclosed herein. In some embodiments, a block copolymer composition includes a diblock copolymer and a triblock copolymer, each including a polyolefin-based block and a polystyrene-based block, wherein the polyolefin-based blocks are present between 45 wt % to 90 wt %, wherein the polystyrene-based blocks are present between 10 wt % to 55 wt %, wherein the difference (ΔT) between a thermal decomposition initiation temperature and a thermal decomposition termination temperature (ΔT) measured by Thermo-Gravimetric Analysis (TGA) is 55° C. or greater, and the diblock copolymer and the triblock copolymer do not have a residual unsaturated bond.

15 Claims, No Drawings

(56) References Cited

OTHER PUBLICATIONS

International Search Report for Application No. PCT/KR2019/003751 dated Jul. 10, 2019, 2 pages.
International Search Report for Application No. PCT/KR2019/003754 dated Jul. 10, 2019, 2 pages.
Kim et al., "Polystyrene Chain Growth from Di-End-Functional Polyolefins for Polystyrene-Polyolefin -Polystyrene Block Copolymers," Polymers, Oct. 2017, pp. 1-14, vol. 9, No. 481.
Kim et al., "Preparation of polystyrene-polyolefin multiblock copolymers by sequential coordination and anionic polymerization," RSC Advances, Jan. 9, 2017, pp. 5948-5956, vol. 7, No. 10.
Ning et al., "Synthesis of Amphiphilic Block-Graft Copolymers [Poly(styrene-b-ethylene-co-butylene-b-styrene)-g-Poly(acrylic acid)] and Their Aggregation in Water," Journal of Polymer Science Part A: Polymer Chemistry. May 1, 2002, pp. 1253-1266, vol. 40, No. 9.
Peinado, et al., "Effects of ozone in surface modification and thermal stabiity of SEBS block copolymers," Polymer Degradation and Stability, Jun. 1, 2010, pp. 975-986, vol. 95, No. 6.
Rabagliati, et al., "Styrene/(Styrene Derivative) and Styrene/(1-Alkene) Copolymerization Using Ph2Zn-Additive Initiator Systems," Macromol. Symp., Sep. 2004, pp. 55-64, vol. 216, No. 1.
Weiser et al., "Formation of Polyolefin-block-polystyrene Block Copolymers on Phenoxyimine Catalystsa," Molecular Rapid Communications, Jul. 5, 2006, pp. 1009-1014, vol. 27, No. 13.
Cao X et al: "Polyisobutylene Based Thermoplastic Elastomers: Vi. Pol Y(Alpha-Methylstyrene-Bisobutylene-B-Alpha-Methylstyrene) Triblock Copolymers by Coupling of Living Poly (Alphamethylstyrene-B-Isobutylene) Diblock Copolymers", Polymer Bulletin, Springer, Heidelberg, De, vol. 45, No. 2, Sep. 1, 2000 (Sep. 1, 2000), pp. 121-128, Xp000977 404.
European Search Report for Application No. 19776148.9, dated Nov. 20, 2020, 7 pages.
European Search Report for Application No. 19778223.8, dated Nov. 20, 2020, 7 pages.
European Search Report for Application No. EP 19775609.1, dated Nov. 20, 2020, 7 pages.
European Search Report for Application No. EP 19776273.5, dated Nov. 20, 2020, 7 pages.
Indian Examination Report for Application No. 202017042499 dated Jan. 19, 2022, 2 pages.

\* cited by examiner

BLOCK COPOLYMER COMPOSITION

CROSS-REFERENCE TO RELATED APPLICATIONS

The present application is a national phase entry under 35 U.S.C. § 371 of International Application No. PCT/KR2019/003751, filed on Mar. 29, 2019, which claims priority from Patent Applications Nos. 10-2018-0037549, filed on Mar. 30, 2018, and 10-2018-0117839, filed on Oct. 2, 2018, the disclosures of which are incorporated by reference herein.

TECHNICAL FIELD

The present invention relates to a block copolymer composition, and more specifically, to a block copolymer composition including a diblock copolymer and a triblock copolymer each including a polyolefin-based block and a polystyrene-based block.

BACKGROUND ART

Polyolefin-polystyrene block copolymers, for example, styrene-ethylene/butylene-styrene (SEBS) or styrene-ethylene/propylene-styrene (SEPS), are currently forming a market of hundreds of thousands of tons worldwide. In addition, such polyolefin-polystyrene block copolymers have the advantage of having excellent heat resistance and light resistance compared to styrene-butadiene-styrene (SBS) or styrene-isoprene-styrene (SIS), and are used for materials for soft and strong grip and touch of handles, elastic materials for diapers, oil-gels used in medical and communication materials, impact modifiers for engineering plastics, flexibilizers or tougheners for transparent polypropylene. SEBS is typically prepared by a two-step reaction, which includes performing anionic polymerization on styrene and butadien to obtain SBS and hydrogenating the obtained SBS. SEPS is also typically prepared by a two-step reaction, which includes performing anionic polymerization on styrene and isoprene to obtain SIS and hydrogenating the obtained SIS. Such processes of saturating all the unsaturated bonds contained in a polymer main chain by a hydrogenation reaction as described above have high processing costs, so that the unit cost of SEBS and SEPS are significantly higher than that of SBS and SIS before the hydrogenation reaction. The above fact may limit market expansion. In addition, since it is practically impossible to saturate all the unsaturated bonds in a polymer chain through a hydrogenation reaction, commercialized SEBS and SEPS inevitably contain some residual unsaturated bonds, the presence of which often cause problems (Journal of Polymer Science: Part A: Polymer Chemistry, 2002, 40, 1253; Polymer Degradation and Stability 2010, 95, 975). Furthermore, a typical block copolymer produced through two steps as described above is very limited in structure since a polyolefin block is formed through a hydrogenation reaction after the anionic polymerization of butadien or isoprene.

DISCLOSURE OF THE INVENTION

Technical Problem

An aspect of the present invention provides a block copolymer composition having improved heat resistance and including a diblock copolymer and a triblock copolymer each including a polyolefin-based block and a polystyrene-based block.

Technical Solution

According to an aspect of the present invention, there is provided a block copolymer composition including a diblock copolymer and a triblock copolymer each including a polyolefin-based block and a polystyrene-based block, the block copolymer composition characterized by including 45 wt % to 90 wt % of a polyolefin-based block and 10 wt % to 55 wt % of a polystyrene-based block, having a difference ($\Delta T$) between a thermal decomposition initiation temperature and a thermal decomposition termination temperature, measured by Thermo-Gravimetric Analysis (TGA), of 55° C. or greater, and having no residual unsaturated bond in the triblock copolymer and the diblock copolymer.

Advantageous Effects

A block copolymer composition according to the present invention is a block copolymer composition including a diblock copolymer and a triblock copolymer each including a polyolefin-based block and a polystyrene-based block. The block copolymer composition does not include unsaturated bonds in the molecular structure of a block copolymer, and thus, may exhibit excellent heat resistance.

BEST MODE FOR CARRYING OUT THE INVENTION

Hereinafter, the present invention will be described in more detail to facilitate understanding of the present invention.

It will be understood that words or terms used in the specification and claims of the present invention shall not be construed as being limited to having the meaning defined in commonly used dictionaries. It will be further understood that the words or terms should be interpreted as having meanings that are consistent with their meanings in the context of the relevant art and the technical idea of the invention, based on the principle that an inventor may properly define the meaning of the words or terms to best explain the invention.

The term 'composition' used in the present specification includes not only a reaction product and a decomposition product formed from materials of a corresponding composition, but also a mixture of materials including the corresponding composition.

The term 'residual unsaturated bond' used in the present specification means an unsaturated bond such as double bond and a triple bond present in a polymer chain of a block copolymer contained in a block copolymer composition. The polymer chain includes a main chain and a branched chain of a block copolymer, and includes not only an unsaturated bond either contained in a raw material for producing the block copolymer, such as a monomer, a multimer, an initiator, and a catalyst, or derived therefrom, but also an unsaturated bond generated in a polymerization process.

The term 'halogen' used in the present specification means fluorine, chlorine, bromine, or iodine unless otherwise stated.

The term 'alkyl' used in the present specification means a linear, cyclic or branched hydrocarbon moiety unless otherwise stated.

The term 'aryl' used in the present specification refers to an aromatic group including phenyl, naphthyl anthryl, phenanthrenyl, chrycenyl, pyrenyl, and the like, unless otherwise stated.

In the present specification, 'silyl' may be silyl substituted or unsubstituted with alkyl having 1 to 20 carbon atoms, for example, trimethylsilyl, or triethylsilyl.

A block copolymer composition of the present invention is a block copolymer composition including a diblock copolymer and a triblock copolymer each including a polyolefin-based block and a polystyrene-based block, the block copolymer composition including 45 wt % to 90 wt % of a polyolefin-based block and 10 wt % to 55 wt % of a polystyrene-based block, and having a difference ($\Delta T$) between a thermal decomposition initiation temperature and a thermal decomposition termination temperature, measured by Thermo-Gravimetric Analysis (TGA), of 55° C. or greater. Since the triblock copolymer and the diblock copolymer do not have a residual unsaturated bond therein, improved heat resistance may be exhibited.

When the temperature at which thermal decomposition starts (i.e., thermal decomposition initiation temperature)_. and the temperature at which the thermal decomposition ends (i.e., thermal decomposition termination temperature) are measured by Thermo-Gravimetric Analysis (TGA), the block copolymer composition of the present invention may have a big difference ($\Delta T$) between the temperature at which the thermal decomposition starts and the temperature at which the thermal decomposition ends of 55° C. or greater, specifically 55° C. to 70° C., and more specifically 57° C. to 65° C. The block copolymer composition of the present invention has no residual unsaturated bonds in the block copolymer and includes 45 wt % to 90 wt % of a polyolefin-based block and 10 wt % to 55 wt % of a polystyrene-based block, and thus, may exhibit improved heat resistance. When the difference ($\Delta T$) between the temperature at which the thermal decomposition starts and the temperature at which the thermal decomposition ends satisfies the above range, the block copolymer composition may exhibit improved heat resistance and excellent processability.

When the temperature at which thermal decomposition starts and the temperature at which the thermal decomposition ends are measured by Thermo-Gravimetric Analysis (TGA) for the block copolymer composition, the temperature at which the thermal decomposition ends may be 440° C. to 470° C., and the temperature at which the thermal decomposition starts may be 385° C. to 405° C. Specifically, the temperature at which the thermal decomposition ends may be 445° C. to 465° C., and the temperature at which the thermal decomposition starts may be 388° C. to 405° C. More specifically, the temperature at which the thermal decomposition ends may be 448° C. to 463° C., and the temperature at which the thermal decomposition starts may be 390° C. to 403° C.

The block copolymer composition according to an exemplary embodiment of the present invention may satisfy (1) the weight average molecular weight (Mw) of 70,000 g/mol to 120,000 g/mol, specifically 72,000 g/mol to 110,000 g/mol, and more specifically 74,000 g/mol to 103,000 g/mol. In the present invention, the weight average molecular weight (Mw) is a polystyrene conversion molecular weight analyzed by gel permeation chromatography (GPC).

Also, the block copolymer composition may satisfy (2) the polydispersity index (PDI) of 1.0 to 2.0, specifically 1.2 to 1.8, and more specifically 1.4 to 1.7. In the present invention, the polydispersity index means the ratio of Mw/Mn, wherein Mw represents the weight average molecular weight and Mn represents the number average molecular weight.

In addition, the block copolymer composition may satisfy (3) the glass transition temperature (Tg) of −55° C. to −30° C., specifically −55° C. to −39° C., and more specifically −52° C. to −39° C. The glass transition temperature (Tg) may be measured using a dynamic mechanical analyzer (DMA).

Also, the block copolymer composition may satisfy (4) the melt index (MI, 230° C., and 5 kg load condition) of 0.2-3.0 g/10 min, specifically 0.3-2.5 g/10 min, and more specifically 0.3 to 2.1 g/10 min.

The melt index (MI) affects the mechanical properties, impact strength, and formability of a block copolymer. In the present specification, the melt index may be measured according to ASTM D1238 (ISO 1133) under the conditions of 230° C. and 5 kg load.

When the block copolymer composition of the present invention simultaneously satisfies the conditions of (1) to (4), the block copolymer composition has a high molecular weight and exhibits a wide molecular weight distribution, and thus, may exhibit improved heat resistance and excellent processability as described above.

The block copolymer composition of the present invention may be produced by, for example, a production method including (a) a step of reacting an organic zinc compound with one or more kinds of olefin-based monomers in the presence of a transition metal catalyst to form an olefin-based polymer block, thereby preparing an intermediate, and (b) a step of reacting the intermediate obtained in Step (a) with a styrene-based monomer in the presence of an alkyl-lithium compound to form a styrene-based polymer block.

(a) Step of reacting an organic zinc compound with one or more kinds of olefin-based monomers in the presence of a transition metal catalyst to form an olefin-based polymer block, thereby preparing an intermediate In Step (a), the olefin-based monomer may be inserted between Zn and A of the organic zinc compound and polymerized to form an olefin-based polymer block.

In an exemplary embodiment of the present invention, the olefin-based polymer block formed by the polymerization of one or more kinds of the olefin-based monomers may include a repeating unit represented by Formula 1 below, and in the present specification, the olefin-based polymer block including a repeating unit represented by Formula 1 below is denoted as a first block.

In Step (a), the olefin-based monomer may form the first block including one or more kinds of repeating units represented by Formula 1 below.

[Formula 1]

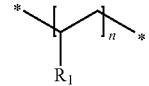

In Formula 1, $R_1$ is hydrogen, alkyl having 1 to 20 carbon atoms, alkyl having 1 to 20 carbon atoms substituted with silyl, arylalkyl having 7 to 20 carbon atoms, or arylalkyl having 7 to 20 carbon atoms substituted with silyl, and n may be an integer of 1 to 10,000.

Alternatively, in an exemplary embodiment of the present invention, $R_1$ may be hydrogen, or alkyl having 3 to 20 carbon atoms.

Alternatively, in an exemplary embodiment of the present invention, $R_1$ may be hydrogen, or alkyl having 3 to 12 carbon atoms. Specifically, $R_1$ may be hydrogen, or alkyl having 4 to 12 carbon atoms.

Alternatively, n may be an integer of 10 to 10,000. Specifically, n may be an integer of 500 to 7,000.

Meanwhile, in the formulas shown in the specification of the present invention, "*" is a terminal site of a repeating unit and represents a connection site.

In an exemplary embodiment of the present invention, when the first block includes two or more kinds of repeating units represented by Formula 1 above, the first block may include a repeating unit represented by Formula 2 below.

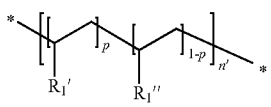

[Formula 2]

In Formula 2, $R_1'$ and $R_1''$ are each independently hydrogen, alkyl having 1 to 20 carbon atoms, alkyl having 1 to 20 carbon atoms substituted with silyl, arylalkyl having 7 to 20 carbon atoms, or arylalkyl having 7 to 20 carbon atoms substituted with silyl, wherein $R_1'$ and $R_1''$ are different from each other, $0<p<1$, and n' may be an integer of 1 to 10,000.

Alternatively, in an exemplary embodiment of the present invention, $R_1'$ and $R_1''$ may be each independently hydrogen, or alkyl having 3 to 20 carbon atoms, and specifically, may be each independently hydrogen, or alkyl having 3 to 12 carbon atoms, and more specifically, may be each independently hydrogen, or alkyl having 4 to 12 carbon atoms.

Alternatively, n' may specifically be an integer of 10 to 10,000, and more specifically, may be an integer of 500 to 7,000.

In an exemplary embodiment of the present invention, in Formula 2, either $R_1'$ or $R_1''$ may be hydrogen, and the other one may be a substituent other than hydrogen among the substituents described above.

That is, in an exemplary embodiment of the present invention, when the first block includes two or more kinds of repeating units represented by Formula 1 above, a structure in which $R_1$ is hydrogen and a structure in which $R_1$ is not hydrogen but alkyl having 1 to 20 carbon atoms, alkyl having 1 to 20 carbon atoms substituted with silyl, arylalkyl having 7 to 20 carbon atoms, or arylalkyl having 7 to 20 carbon atoms substituted with silyl may be randomly connected. Specifically, a structure in which $R_1$ is hydrogen and a structure in which $R_1$ is not hydrogen but alkyl having 3 to 20 carbon atoms may be randomly connected.

Alternatively, more specifically, the first block may have a structure in which $R_1$ is hydrogen and a structure in which $R_1$ is alkyl having 3 to 12 carbon atoms randomly connected to each other. Even more specifically, the first block may have a structure in which $R_1$ is hydrogen and a structure in which $R_1$ is alkyl having 4 to 12 carbon atoms randomly connected to each other.

When the first block includes two or more kinds of repeating units represented by Formula 1 above, in Formula 1, the first block may include a structure in which $R_1$ is hydrogen and a structure in which $R_1$ has a substituent other than hydrogen in a weight ratio of 30:90 to 70:10, specifically 40:60 to 60:40, and more specifically 45:75 to 55:25.

In Formula 1, when the first block includes a structure in which $R_1$ is hydrogen and a structure in which $R_1$ has a substituent other than hydrogen in the above range, a block copolymer to be produced includes branches to an appropriate degree within a structure. Therefore, the produced block copolymer has a high 300% modulus value and a high elongation at break value to exhibit excellent elasticity properties, and has a high molecular weight and exhibits a wide molecular weight distribution to have excellent processability.

In an exemplary embodiment of the present invention, an olefin-based monomer inserted between Zn and A of the organic zinc compound and polymerized, thereby forming the olefin-based polymer block (first block) may include ethylene and one or more kinds of alpha-olefin-based monomers together, and may specifically include ethylene and one or more kinds of alpha-olefin-based monomers other than ethylene.

In an exemplary embodiment of the present invention, the alpha-olefin-based monomer may specifically be an aliphatic olefin having 3 to 20 carbon atoms, more specifically an aliphatic olefin having 4 to 12 carbon atoms, and even more specifically an aliphatic olefin having 5 to 12 carbon atoms. The aliphatic olefin may be, for example, propylene, 1-butene, 1-pentene, 3-methyl-1-butene, 1-hexene, 4-methyl-1-pentene, 3-methyl-1-pentene, 1-heptene, 1-octene, 1-decene, 1-undecene, 1-dodecene, 1-tetradecene, 1-hexadecene, 1-eicosene, 4,4-dimethyl-1-pentene, 4,4-diethyl-1-hexene or 3,4-dimethyl-1-hexene, and the like, and may be any one thereof or a mixture of two or more thereof.

The block copolymer may include 45 wt % to 90 wt % of a polyolefin-based block, specifically 50 wt % to 85 wt % of a polyolefin-based block, and more specifically 57 wt % to 82 wt % of a polyolefin-based block.

The polyolefin-based block may include, based on the total block copolymer composition, a repeating unit derived from ethylene in an amount of 35 wt % to 60 wt %, specifically 37 wt % to 55 wt %, and more specifically 39 wt % to 50 wt %.

Also, the polyolefin-based block may include, based on the total block copolymer composition, a repeating unit derived from alpha-olefin in an amount of 10 wt % to 35 wt %, specifically 15 wt % to 33 wt %, and more specifically 18 wt % to 32 wt %.

When the block copolymer includes the polyolefin-based block in the above range, the polyolefin-based block may impart more appropriate elasticity to the block copolymer.

In an exemplary embodiment of the present invention, the organic zinc compound may be a compound represented by Formula 3 below.

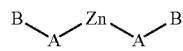

[Formula 3]

In Formula 3, A is alkylene having 1 to 20 carbon atoms, arylene having 6 to 20 carbon atoms, or arylene having 6 to 20 carbon atoms substituted with halogen, alkyl having 1 to 12 carbon atoms, cycloalkyl having 3 to 12 carbon atoms, alkoxy having 1 to 8 carbon atoms or aryl having 6 to 12 carbon atoms, and B is arylene having 6 to 12 carbon atoms substituted with alkenyl having 2 to 12 carbon atoms.

Alternatively, A may be alkylene having 1 to 20 carbon atoms, arylene having 6 to 12 carbon atoms, or arylene having 6 to 20 carbon atoms substituted with halogen, alkyl having 1 to 12 carbon atoms, cycloalkyl having 3 to 12 carbon atoms, alkoxy having 1 to 8 carbon atoms or aryl having 6 to 12 carbon atoms, and B may be arylene having 6 to 12 carbon atoms substituted with alkenyl having 2 to 8 carbon atoms.

Formula 3 may have a structure in which both ends of the formula are double bonds. For example, when B is arylene substituted with alkenyl, the arylene is connected to A and the double bond of the alkenyl substituted in the arylene may be located in the outermost portion of Formula 3.

When the organic zinc compound is reacted with one or more kinds of olefin-based monomers for forming the first block as described above in the presence of a transition metal catalyst for olefin polymerization, the olefin-based monomer is inserted between zinc (Zn) and an organic group (A) of the organic zinc compound and polymerized, so that an intermediate formed with an olefin-based polymer block (first block) may be prepared. An example of the intermediate formed as described above is shown in Formula 4 below.

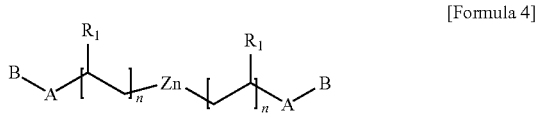

[Formula 4]

In Formula 4, $R_1$ is hydrogen, alkyl having 1 to 20 carbon atoms, alkyl having 1 to 20 carbon atoms substituted with silyl, arylalkyl having 7 to 20 carbon atoms, or arylalkyl having 7 to 20 carbon atoms substituted with silyl, A is alkylene having 1 to 20 carbon atoms, arylene having 6 to 20 carbon atoms, or arylene having 6 to 20 carbon atoms substituted with halogen, alkyl having 1 to 12 carbon atoms, cycloalkyl having 3 to 12 carbon atoms, alkoxy having 1 to 8 carbon atoms or aryl having 6 to 12 carbon atoms, B is arylene having 6 to 12 carbon atoms substituted with alkenyl having 2 to 12 carbon atoms, and n is an integer of 1 to 10,000.

Alternatively, $R_1$ and n are respectively the same as defined in Formula 1, and A and B are respectively the same as defined in Formula 3.

In an exemplary embodiment of the present invention, an example of the intermediate formed by reacting the organic zinc compound with two or more kinds of olefin-based monomers for forming the first block as described above in the presence of a transition metal catalyst for olefin polymerization may be represented by Formula 5 below.

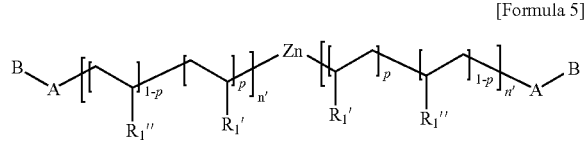

[Formula 5]

In Formula 5, $R_1'$, $R_1''$, p and n' are respectively the same as defined in Formula 2, and A and B are respectively the same as defined in Formula 3.

(b) Step of reacting the intermediate obtained in Step (a) with a styrene-based monomer in the presence of an alkyllithium compound to form a styrene-based polymer block In Step (b), the styrene-based monomer may be inserted between Zn of the intermediate and an olefin-based polymer block and polymerized to form a styrene-based polymer block.

The alkyllithium compound may be an alkyllithium compound including silicon atoms, and may be, for example, $Me_3SiCH_2Li$.

In an exemplary embodiment of the present invention, the styrene-based polymer block formed by the polymerization of the styrene-based monomer may include a repeating unit represented by Formula 6 below. In the present specification, the styrene-based polymer block including a repeating unit represented by Formula 6 below is denoted as a second block.

[Formula 6]

In Formula 6, $R_2$ is aryl having 6 to 20 carbon atoms, or aryl having 6 to 20 carbon atoms substituted with halogen, alkyl having 1 to 12 carbon atoms, cycloalkyl having 3 to 12 carbon atoms, alkoxy having 1 to 8 carbon atoms or aryl having 6 to 12 carbon atoms, and l is independently an integer of 10 to 1,000.

In an exemplary embodiment of the present invention, $R_2$ may be phenyl, or phenyl substituted or unsubstituted with halogen, alkyl having 1 to 8 carbon atoms, cycloalkyl having 3 to 12 carbon atoms, alkoxy having 1 to 8 carbon atoms or aryl having 6 to 12 carbon atoms. Alternatively, $R_2$ may be phenyl.

l is an integer of 10 to 1,000, and may specifically be an integer of 50 to 700. When l is in the above range, the viscosity of a polyolefin-polystyrene block copolymer produced by the production method of the present invention may be at an appropriate level.

In Step (b), since the styrene-based monomer is inserted between Zn of the intermediate and the olefin-based polymer block and polymerized, thereby forming a styrene-based polymer block (second block), a composite block represented by Formula 7 below, the composite block formed by coupling a first block including a repeating unit represented by Formula 1 above and a second block including a repeating unit represented by Formula 6 above, may be formed.

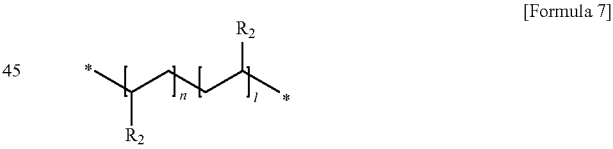

[Formula 7]

In Formula 7, $R_1$ is hydrogen, alkyl having 1 to 20 carbon atoms, alkyl having 1 to 20 carbon atoms substituted with silyl, arylalkyl having 7 to 20 carbon atoms, or arylalkyl having 7 to 20 carbon atoms substituted with silyl, $R_2$ is aryl having 6 to 20 carbon atoms, or aryl having 6 to 20 carbon atoms substituted with halogen, alkyl having 1 to 12 carbon atoms, cycloalkyl having 3 to 12 carbon atoms, alkoxy having 1 to 8 carbon atoms or aryl having 6 to 12 carbon atoms, l is an integer of 10 to 1,000, and n is an integer of 1 to 10,000.

Alternatively, in Formula 7, $R_1$, $R_2$, and n are respectively the same as defined in Formula 1 and Formula 6, respectively.

Alternatively, when the first block includes a repeating unit represented by Formula 2, a composite block formed by coupling a second block including a repeating unit represented by Formula 6 above may be represented by Formula 8 below.

[Formula 8]

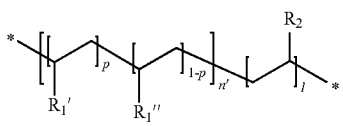

In Formula 8, $R_1'$, $R_1''$, p, l and n' are respectively the same as defined in Formula 2 or Formula 6.

In an exemplary embodiment of the present invention, in Step (b), the styrene-based monomer is inserted between Zn of the intermediate and the olefin-based polymer block and polymerized, thereby forming a styrene-based polymer block (second block), and simultaneously, the styrene-based monomer may be coupled to a portion represented by B in the organic zinc compound represented by Formula 4 and polymerized, so that a separate styrene-based polymer block may be formed. In the present specification, the separate styrene-based polymer block formed by coupling the styrene-based monomer to a portion represented by B and polymerizing the same is denoted as a third block.

In an exemplary embodiment of the present invention, in Step (b), since the second block and the third block are simultaneously formed, a triblock copolymer may be formed.

The third block may include a repeating unit represented by Formula 9 below.

[Formula 9]

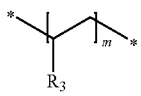

In Formula 9, $R_3$ is aryl having 6 to 20 carbon atoms, or aryl having 6 to 20 carbon atoms substituted with halogen, alkyl having 1 to 12 carbon atoms, cycloalkyl having 3 to 12 carbon atoms, alkoxy having 1 to 8 carbon atoms or aryl having 6 to 12 carbon atoms, and m is independently an integer of 10 to 1,000.

Alternatively, in an exemplary embodiment of the present invention, $R_3$ may be phenyl, or phenyl substituted or unsubstituted with halogen, alkyl having 1 to 8 carbon atoms, cycloalkyl having 3 to 12 carbon atoms, alkoxy having 1 to 8 carbon atoms or aryl having 6 to 12 carbon atoms. Alternatively, $R_3$ may be phenyl.

m is an integer of 10 to 1,000, and may specifically be an integer of 50 to 700.

That is, in an exemplary embodiment of the present invention, in Step (b), the styrene-based monomer may form the second block including a repeating unit represented by Formula 6 above and the third block including a repeating unit represented by Formula 9 above.

Accordingly, the block copolymer composition may include a triblock copolymer including a first block including one or more kinds of repeating units represented by Formula 1 below, a second block including a repeating unit represented by Formula 6 below, and a third block including a repeating unit represented by Formula 9 below.

[Formula 1]

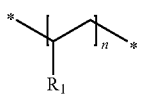

[Formula 6]

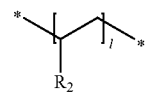

[Formula 9]

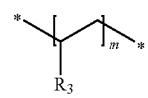

In the above formulas, $R_1$ is hydrogen, alkyl having 1 to 20 carbon atoms, alkyl having 1 to 20 carbon atoms substituted with silyl, arylalkyl having 7 to 20 carbon atoms, or arylalkyl having 7 to 20 carbon atoms substituted with silyl, $R_2$ and $R_3$ are aryl having 6 to 20 carbon atoms, or aryl having 6 to 20 carbon atoms substituted with halogen, alkyl having 1 to 12 carbon atoms, cycloalkyl having 3 to 12 carbon atoms, alkoxy having 1 to 8 carbon atoms or aryl having 6 to 12 carbon atoms, n is an integer of 10 to 10,000, and l and m are each independently an integer of 10 to 1,000.

Alternatively, in the above formulas, $R_1$, $R_2$, $R_3$, n, l and m are respectively the same as defined in Formulas 1, 6, and 9.

In an exemplary embodiment of the present invention, since the first block, the second block, and the third block are formed symmetrically around zinc (Zn) of the organic zinc compound represented by Formula 3, in Step (b), a compound in which a triblock copolymer including three blocks is symmetrically formed around zinc may be formed. An example of the block copolymer formed as described above is shown in Formula 10 below.

[Formula 10]

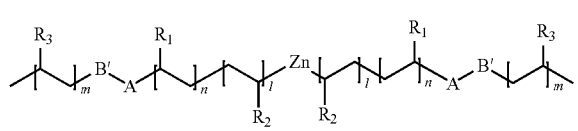

In Formula 10, $R_1$ to $R_3$, l, m and n are respectively the same as defined in Formulas 1, 5, and 7. A is the same as defined in Formula 3, and B' represents a form in which B defined in Formula 3 is coupled with a repeating unit of Formula 9 above.

Alternatively, when the first block includes a repeating unit represented by Formula 2 above, an example of the compound in which a triblock copolymer including three blocks is symmetrically formed around zinc, the compound prepared in Step (b), may be represented by Formula 11 below.

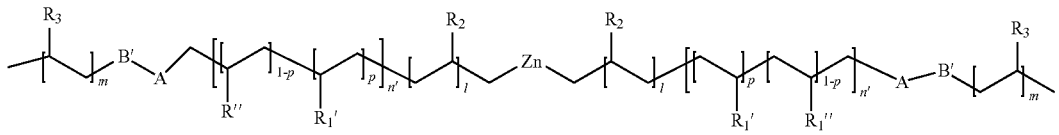

[Formula 11]

In Formula 11, $R_1'$, $R_1''$, $R_2$, $R_3$, p, l, m and n' are respectively the same as defined in Formulas 2, 5, and 7. A is the same as defined in Formula 3, and B' represents a form in which B defined in Formula 3 is coupled with a repeating unit of Formula 9 above.

In an exemplary embodiment of the present invention, when two or more first and second blocks are included, the first block and the second block may be included by having a composite block of a structure represented by Formula 7 or Formula 8 as a repeating unit. For example, when a block copolymer includes two first blocks, two second blocks, and one third block, it means that the block copolymer includes two composite blocks and one third block.

In addition, in an exemplary embodiment of the present invention, when the block copolymer includes two or more composite blocks of Formula 7, composite blocks except for one composite block are connected to the other composite blocks, and may not be connected to a third block. For example, when the block copolymer includes two or more of the composite blocks, the third block is connected with one composite block and the one composite block is extended through the coupling between composite blocks, so that the block copolymer may have a structure of "the third block-composite block-composite block- . . . "

Alternatively, when two composite blocks are connected, a first block and a second block included in the composite blocks may be connected. For example, when a block copolymer according to an exemplary embodiment of the present invention includes one third block and two composite blocks, the block copolymer may have a structure of "the third block-first block-second block-first block-second block- . . . "

As described above, a block copolymer composition according to an exemplary embodiment of the present invention may include a block copolymer including a structure represented by Formula 12 below.

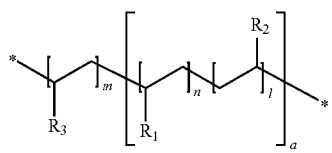

[Formula 12]

In Formula 12, $R_1$ is hydrogen, alkyl having 1 to 20 carbon atoms, alkyl having 1 to 20 carbon atoms substituted with silyl, arylalkyl having 7 to 20 carbon atoms, or arylalkyl having 7 to 20 carbon atoms substituted with silyl, $R_2$ and $R_3$ are each independently aryl having 6 to 20 carbon atoms, or aryl having 6 to 20 carbon atoms substituted with halogen, alkyl having 1 to 12 carbon atoms, cycloalkyl having 3 to 12 carbon atoms, alkoxy having 1 to 8 carbon atoms or aryl having 6 to 12 carbon atoms, 1 and m are each independently an integer of 10 to 1,000, and n is an integer of 1 to 10,000.

Also, in Formula 12, a may be an integer of 1 to 50, specifically an integer of 1 to 20, and more specifically an integer of 1 to 10.

Alternatively, in Formula 12, $R_1$ to $R_3$, 1, m and n are respectively the same as defined in Formulas 1, 6, and 9.

Alternatively, a block copolymer composition according to an exemplary embodiment of the present invention may include a block copolymer including a structure represented by Formula 13 below.

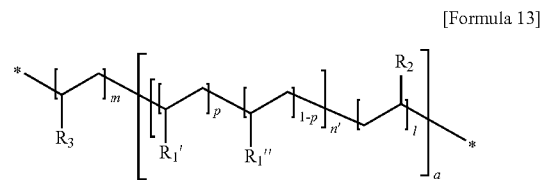

[Formula 13]

In Formula 13, $R_1'$ and $R_1''$ are each independently hydrogen, alkyl having 1 to 20 carbon atoms, alkyl having 1 to 20 carbon atoms substituted with silyl, arylalkyl having 7 to 20 carbon atoms, or arylalkyl having 7 to 20 carbon atoms substituted with silyl, wherein $R_1'$ and $R_1''$ are different from each other, $0<p<1$, $R_2$ and $R_3$ are each independently aryl having 6 to 20 carbon atoms, or aryl having 6 to 20 carbon atoms substituted with halogen, alkyl having 1 to 12 carbon atoms, cycloalkyl having 3 to 12 carbon atoms, alkoxy having 1 to 8 carbon atoms or aryl having 6 to 12 carbon atoms, 1 and m are each independently an integer of 10 to 1,000, and n is an integer of 1 to 10,000.

Also, in Formula 13, a may be an integer of 1 to 50, specifically an integer of 1 to 20, and more specifically an integer of 1 to 10.

Alternatively, in Formula 13, $R_1'$, $R_1''$, $R_2$, $R_3$, p, 1, m and n' are respectively the same as defined in Formulas 2, 6, and 9.

In an exemplary embodiment of the present invention, the styrene-based monomer may be, for example, a styrene-based monomer substituted with halogen, alkyl having 1 to 8 carbon atoms, cycloalkyl having 3 to 12 carbon atoms, alkoxy having 1 to 8 carbon atoms or aryl having 6 to 12 carbon atoms.

As described above, since the second block and the third block are simultaneously formed in Step (b), a triblock copolymer may be formed. When either the second block or the third block is not formed in Step (b), a diblock copolymer is formed.

The block copolymer composition of the present invention is a block copolymer composition including a diblock copolymer and a triblock copolymer each including a polyolefin-based block and a polystyrene-based block, wherein the content of the diblock copolymer may be 19 wt % or less. When the content of the diblock copolymer is 19 wt % or less, the block copolymer composition may have excellent chemical durability, mechanical properties, and melt processability while exhibiting excellent thermal stability.

The diblock copolymer may be a polyolefin-polystyrene diblock copolymer, and the triblock copolymer may be a polystyrene-polyolefin-polystyrene triblock copolymer. The content of the diblock copolymer and the triblock copolymer is influenced by the ratio of the number of moles of the organic zinc compound used in Step (a) and the number of moles of the alkyllithium compound used in Step (b).

In an exemplary embodiment of the method for producing a block copolymer composition of the present invention, the number of moles of the alkyllithium compound used in Step (b) may be larger than the number of moles of the organic zinc compound used in Step (a). In other words, in the production process of the block copolymer of the present invention, the amount of lithium (Li) used may be more than the amount of zinc (Zn) used. When the number of moles of the alkyllithium compound used in Step (b) is larger than the number of moles of the organic zinc compound used in Step (a), the polymerization rate is increased so that productivity is increased, and both the zinc (Zn) and olefin-based polymer ends are initiated so that the triblock copolymer may be effectively synthesized. Meanwhile, the number of moles of the alkyllithium compound used in Step (b) is not particularly limited as long as it is larger than the number of moles of the organic zinc compound used in Step (a). However, the ratio of the number of moles of the organic zinc compound used in Step (a) to the number of moles of the alkyllithium compound used in Step (b) may be 1:1.05 to 1:4, specifically 1:1 to 1:3, and more specifically 1:1 to 2:5.

According to the method for producing a block copolymer composition according to an exemplary embodiment of the present invention, since the amount of lithium (Li) used is more than the amount of zinc (Zn) used, both the zinc (Zn) and olefin-based polymer ends are initiated to effectively synthesize the triblock copolymer, so that the content of the diblock polymer may be minimized. The block copolymer composition of the present invention may include the diblock copolymer among copolymer compositions in an amount of 19 wt % or less, specifically 18 wt % or less, and more specifically 17 wt % or less. As the content of the diblock copolymer increases, the mechanical properties of the copolymer composition may decrease. Therefore, the smaller the content of the diblock copolymer, the better. However, the lowest limit of the diblock copolymer content may be 0.1 wt %. In an exemplary embodiment of the present invention, the diblock copolymer may include the structure of Formula 7 or Formula 8, and the triblock copolymer may include the structure of Formula 12 or Formula 13. Alternatively, the diblock copolymer may have a $CH_3$ type structure in which one end of Formula 7 or Formula 8 is coupled with a unit derived from the organic zinc compound of Formula 3, that is, B and A defined in Formula 3, and the other end thereof is terminated, and the triblock copolymer may have the structure of Formula 14 or Formula 15.

In an exemplary embodiment of the present invention, in Step (b), an amine-based compound, specifically, a triamine compound may be used with the alkyllithium compound, and the triamine compound may be, for example, N,N,N",N",N"-pentamethyldiethylenetriamine (PMDETA). The alkyllithium compound and the amine-based compound may be used in a molar ratio of, for example, 0.5:1 to 1:1. The amine-based compound may act as an initiator in combination with alkyllithium compound.

The block copolymer composition according to an exemplary embodiment of the present invention may include, based on the total block copolymer composition, the first block in an amount of 10 wt % to 99 wt % and the second block and the third block in an amount of 1 wt % to 90 wt % in total. Alternatively, the block copolymer composition may specifically include the first block in an amount of 40 wt % to 85 wt % and the second block and the third block in an amount of 15 wt % to 60 wt % in total. Even more specifically, the block copolymer composition may include the first block in an amount of 60 wt % to 80 wt % and the second block and the third block in an amount of 20 wt % to 40 wt % in total.

Also, an exemplary embodiment of the method for producing a block copolymer composition of the present invention may further include (c) a step of reacting the product produced in Step (b) with water, oxygen, or an organic acid to convert the product into a block copolymer.

The product produced in Step (b) may be represented by Formula 8 as described above. When water, oxygen, or an organic acid is introduced to the compound produced in Step (b) which includes block copolymers symmetrically formed around zinc (Zn), zinc and a block coupled to the zinc are separated so that two block copolymers may be formed.

Accordingly, the block copolymer composition according to an exemplary embodiment of the present invention may include a structure in which a unit derived from a compound used in the production process of the block copolymer composition, the compound being specifically the organic zinc compound of Formula 3, is included between the third block and the first block. An example of the block copolymer structure is shown in Formula 14 below.

[Formula 14]

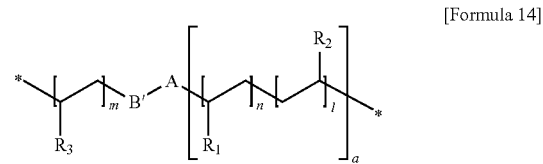

In Formula 14, $R_1$ to $R_3$, 1, m and n are respectively the same as defined in Formulas 1, 5, and 7. A is the same as defined in Formula 3, and B' represents a form in which B defined in Formula 3 is coupled with a repeating unit of Formula 9 above.

In addition, another exemplary embodiment of the block copolymer structure in which a unit derived from a compound used in the production process of the block copolymer composition, the compound being specifically the organic zinc compound of Formula 3, is included between the third block and the first block may be represented by Formula 15 below.

[Formula 15]

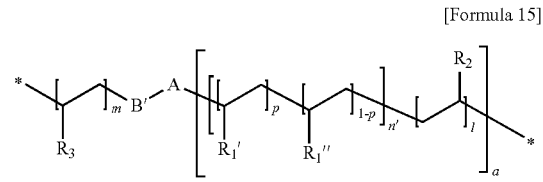

In Formula 15, $R_1'$, $R_1''$, $R_2$, $R_3$, p, 1, m and n' are respectively the same as defined in Formulas 2, 6, and 9. A is the same as defined in Formula 3, and B' represents a form in which B defined in Formula 3 is coupled with a repeating unit of Formula 9 above.

The method for producing a block copolymer composition does not use a monomer which may leave a residual unsaturated bond like a diene compound such as butadiene or isoprene in a process for preparing a polyolefin-based block, the process which is included in the method. Therefore, the method does not require a separate hydrogenation reaction to saturate a residual unsaturated bond, and also does not have a problem in which an unsaturated bond not saturated even by a hydrogenation reaction remains. Accordingly, the block copolymer composition of the present invention does not include an unsaturated bond, and thus, may exhibit excellent heat resistance.

MODE FOR CARRYING OUT THE INVENTION

Examples

Hereinafter, embodiments of the present invention will be described in detail so that those skilled in the art may easily carry out the present invention. The present invention may, however, be embodied in many different forms and is not limited to the embodiments set forth herein.

Preparation Example: Preparing Organic Zinc Compound

[Formula 16]

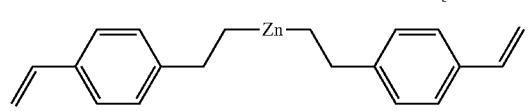

Borane dimethyl sulfide (1.6 mL, 3.2 mmol) was slowly introduced to triethyl borane (0.6 g) in stirring and then reacted for 90 minutes. The mixture was slowly introduced to divinylbenzen (3.8 g) dissolved in anhydrous diethyl ether (10 mL) cooled to −20° C. and then stirred overnight. A solvent was removed with a vacuum pump and then diethyl zinc (0.8 g) was added. A reaction was performed at 0° C. for 5 hours while removing triethyl borane generated through reduced pressure distillation. At 40° C., excess divinylbenzene and diethylzinc were removed by reduced pressure distillation. Methylcyclohexane (150 mL) was added to dissolve a product again, and then a solid compound produced as a by-product was filtered using celite and removed to prepare an organic zinc compound represented by Formula 16 above.

Example 1

30 mL of 1-hexene and 357 µmol of an organic zinc compound { $(CH_2=CHC_6H_4CH_2CH_2)_2Zn$ } dissolved in 100 g of methylcyclohexane was introduced into a high-pressure reactor, and then the temperature of the reactor was raised to 80° C.

A solution (5 µmol) containing a transition metal compound represented by Formula 17 below and [ $(C_{18}H_{37})N(Me)]H^+[B(C_6F_5)_4]^-$ which is a cocatalyst at a ratio of 1:1 was injected into the high-pressure reactor, and then ethylene was immediately injected thereto to maintain the pressure at 20 bar.

A polymerization process was performed at a temperature of 95° C. to 100° C. for 45 minutes, and then unreacted gas was discharged. $Me_3SiCH_2Li$ and N,N,N″,N″,N″-pentam-ethyldiethylenetriamine (PMDETA) were mixed at a ratio of 1:1 (420 µmol) in methylcyclohexane, and the mixture was injected to the reactor and then stirred for 30 minutes. The stirring temperature was maintained at 90° C. to 100° C. 6.5 mL of styrene was injected to the high-pressure reactor and then, while maintaining the temperature between 90° C. and 100° C., was reacted over 5 hours to convert all the styrene monomers. After the complete conversion of the styrene, acetic acid and ethanol were continuously injected. A polymer obtained therefrom was dried overnight in a vacuum oven of 80° C.

[Formula 17]

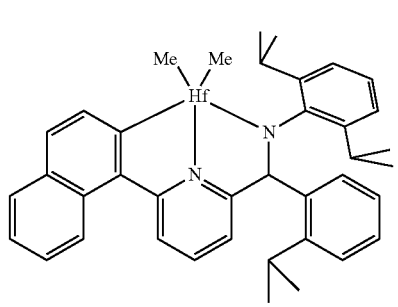

Examples 2 to 5

A polymer was produced in the same manner as in Example 1 except that 1-hexene, styrene, an organic zinc compound, methylcyclohexane, a transition metal compound/cocatalyst solution, $Me_3SiCH_2Li$ and PMDETA were used in the amounts shown in Table 1 below.

Example 6

150 µmol of an organic zinc compound { $(CH_2=CHC_6H_4CH_2CH_2)_2Zn$ } dissolved in 100 g of methylcyclohexane was introduced into a high pressure reactor, and the temperature of the reactor was raised to 80° C.

A solution (4 µmol) containing a transition metal compound represented by Formula 12 and [ $(C_{18}H_{37})N(Me)]H^+[B(C_6F_5)_4]^-$ which is a cocatalyst at a ratio of 1:1 was injected to the high-pressure reactor, and then 30 g of propylene was immediately injected thereto, followed by ethylene to bring the pressure to 20 bar. The pressure was maintained at 20 bar.

At a temperature of 95° C. to 110° C., a polymerization process was performed for 45 minutes, and then gas was discharged. $Me_3SiCH_2Li$ and N,N,N″,N″,N″-pentamethyl-diethylenetriamine (PMDETA) were mixed at a ratio of 1:1 (150 µmol) in methylcyclohexane, and the mixture was injected to the reactor and then stirred for 30 minutes. The stirring temperature was maintained at 90° C. to 110° C. 7.8 g of styrene was injected to the high-pressure reactor and then, while maintaining the temperature between 90° C. and 110° C., was reacted over 5 hours to convert all the styrene monomers. After the complete conversion of the styrene, acetic acid and ethanol were continuously injected. A polymer obtained therefrom was dried overnight in a vacuum oven of 80° C.

Example 7

A polymer was produced in the same manner as in Example 6 except that 35 g of propylene was injected, followed by ethylene to bring the pressure to 20 bar and the pressure was maintained at 20 bar.

TABLE 1

| | Alpha-olefin (mL) | Styrene (mL) | Organic zinc compound (μmol) | Methyl-cyclohexane (g) | Transition metal compound/ Cocatalyst solution (μmol) | Me$_3$SiCH$_2$Li/ PMDETA (μmol) |
|---|---|---|---|---|---|---|
| | | | | Amount used | | |
| Example 1 | 1-hexene 30 | 6.5 | 357 | 100 | 5 | 420 |
| Example 2 | 1-hexene 60 | 13 | 714 | 200 | 5 | 815 |
| Example 3 | 1-hexene 60 | 14 | 714 | 200 | 5 | 815 |
| Example 4 | 1-hexene 60 | 13 | 571 | 200 | 5 | 714 |
| Example 5 | 1-hexene 50 | 13 | 731 | 200 | 5 | 988 |
| Example 6 | Propylene 30 | 7.8 | 150 | 100 | 4 | 150 |
| Example 7 | Propylene 35 | 7.8 | 150 | 100 | 4 | 150 |

Comparative Examples 1 to 4

As Comparative Examples 1 to 4, G1650, G1652, G1654, and G1643 of Kraton Company, which are commercially available SEBS, were used, respectively.

Experimental Examples

The physical properties of the block copolymer of each of Examples 1 to 7 and Comparative Examples 1 to 4 were measured according to the following methods, and the results are shown in Table 2 below.

1) Measurement of Content of Ethylene, Alpha-Olefin, and Styrene

The measurement was performed through nuclear magnetic resonance (NMR). Using Bruker 600 MHz AVANCE III HD NMR device, 1H NMR was measured under the condition of ns=16, d1=3s, solvent=TCE-d2, and 373K, and then the TCE-d2 solvent peak was calibrated to 6.0 ppm. CH$_3$ of 1-propylene was confirmed at 1 ppm and a CH$_3$-related peak (triplet) of a butyl branch by 1-hexene was confirmed near 0.96 ppm to calculate the contents. In addition, the content of styrene was calculated using an aromatic peak near 6.5 to 7.5 ppm.

2) Weight Average Molecular Weight (Mw, g/mol) and Polydispersity Index (PDI)

The weight average molecular weight (Mw, g/mol) and the number average molecular weight (Mn, g/mol) were measured by gel permeation chromatography (GPC), respectively, and the weight average molecular weight was divided by the number average molecular weight to calculate the polydispersity index (PDI).
Column: PL Olexis
Solvent: TCB (Trichlorobenzene)
Flow rate: 1.0 ml/min
Sample concentration: 1.0 mg/ml
Injection amount: 200 μℓ
Column temperature: 160° C.
Detector: Agilent High Temperature RI detector
Use polystyrene standard Calculate molecular weight by Universal calibration using the Mark-house equation (K=40.8×10$^{-5}$, α=0.7057)

3) Measurement of Heat Resistance

The temperature at which thermal decomposition starts ($T_{onset}$) and the temperature at which the thermal decomposition ends ($T_{end}$) were measured by Thermo-Gravimetric Analysis (TGA), and the difference (ΔT) between the temperature at which the thermal decomposition starts and the temperature at which the thermal decomposition ends was calculated. The difference (ΔT) was measured while raising the temperature at an interval of 10° C./min in a temperature range of 20° C. to 700° C., and was measured in a nitrogen atmosphere accurately.

4) Content of Residual Unsaturated Bond

The measurement was performed through nuclear magnetic resonance (NMR). Using Bruker 600 MHz AVANCE III HD NMR device, 1H NMR was measured under the condition of ns=16, d1=3s, solvent=TCE-d2, and 373K, and then the TCE-d2 solvent peak was calibrated to 6.0 ppm. CH$_2$ of a double bond was confirmed at 5-5.5 ppm to calculate the content.

5) Content of Diblock Copolymer

A peak deconvolution was carried out between a GPC curve obtained using gel permeation chromatography (GPC) and two Gaussian curves.

As a program for peak deconvolution, Origin was used, and in the analysis, Multiple Peak Fit was used. Specifically, a measured molecular weight was assumed to be the molecular weight of the triblock copolymer and 75% of the measured molecular weight was assumed to be the molecular weight of the diblock copolymer, and two peaks of Gaussian curves were fitted. A weight percentage was calculated on the basis of a derived area percentage and the measured molecular weight.

TABLE 2

|  | Composition | | | Molecular weight | | Residual unsaturated | Heat resistance (TGA) | | Content of diblock |
| --- | --- | --- | --- | --- | --- | --- | --- | --- | --- |
|  | Ethylene (wt %) | Alpha-olefin (wt %) | Styrene (wt %) | Mw (g/mol) | PDI | bond (wt %) | $T_{onset}/T_{end}$ | ΔT | copolymer (wt %) |
| Example 1 | 47.7 | 25.8 | 26.5 | 76,700 | 1.6 | 0 | 391.62/449.41 | 57.43 | 13.8 |
| Example 2 | 46.9 | 28.7 | 24.4 | 79,700 | 1.7 | 0 | 390.62/459.84 | 69.22 | 10.2 |
| Example 3 | 42.6 | 27.9 | 29.5 | 65,800 | 1.7 | 0 | 390.41/458.66 | 68.25 | 11.7 |
| Example 4 | 48.4 | 31.6 | 22.0 | 76,100 | 1.8 | 0 | 398.71/460.95 | 62.24 | 13.2 |
| Example 5 | 49.1 | 25.3 | 25.5 | 98,000 | 1.8 | 0 | 401.34/464.35 | 63.01 | 13.7 |
| Example 6 | 39.3 | 18.6 | 42.1 | 111,000 | 1.7 | 0 | 391.05/452.84 | 61.79 | 21.7 |
| Example 7 | 45.5 | 22.5 | 32.0 | 109,000 | 1.7 | 0 | 390.47/454.24 | 63.77 | 20.2 |
| Comparative Example 1 | 44.3 | 26.2 | 29.5 | 54,600 | 1.1 | 0.99 | 390.41/441.19 | 50.78 | 0 |
| Comparative Example 2 | 44.6 | 26.6 | 28.8 | 44,100 | 1.1 | 0.24 | 390.39/440.11 | 49.72 | 0 |
| Comparative Example 3 | 43.3 | 25.5 | 31.2 | 95,600 | 1.1 | 0.42 | 391.05/435.70 | 44.65 | 0 |
| Comparative Example 4 | 19.1 | 61.5 | 19.4 | 69,600 | 1.3 | 0.49 | 368.62/425.33 | 56.71 | 0 |

Referring to Table 1, the block copolymer composition of each of Examples 1 to 7 has a bigger difference (ΔT) between the heat decomposition initiation temperature and the heat decomposition termination temperature, measured by Thermo-Gravimetric Analysis (TGA), when compared with the block copolymer composition of each of Comparative Examples 1 to 4. As described above, the block copolymer composition of each of Examples 1 to 7 includes a block copolymer which does not include an unsaturated bond in the molecular structure thereof, and thus, exhibited more improved heat resistance when compared with the block copolymer composition of each of Comparative Examples 1 to 4 which includes an unsaturated bond. In addition, the block copolymer composition of each of Examples 1 to 7 had a larger value of polydispersity index (PDI) when compared with the block copolymer composition of each of Comparative Examples 1 to 4. From the result, it can be expected that the block copolymer composition of each of Examples 1 to 7 may exhibit relatively excellent processability while exhibiting improved heat resistance.

The invention claimed is:
1. A block copolymer composition, comprising:
a diblock copolymer and a triblock copolymer, wherein each include a polyolefin-based block and a polystyrene-based block,
wherein the polyolefin-based blocks of the diblock and the triblock copolymers are present between 45 wt % to 90 wt %, and the polystyrene-based blocks of the diblock and the triblock copolymers are present between 10 wt % to 55 wt %, based on the total weight of the block copolymer composition,
wherein a difference (ΔT) between a thermal decomposition initiation temperature and a thermal decomposition termination temperature, measured by Thermo-Gravimetric Analysis (TGA), is 55° C. or greater,
wherein the diblock copolymer and the triblock copolymer do not have a residual unsaturated bond therein, and
wherein the block copolymer composition has weight average molecular weight (Mw) of 60,000 g/mol to 120,000 g/mol.
2. The block copolymer composition of claim 1, wherein the polyolefin-based block comprises a repeating unit derived from ethylene and a repeating unit derived from alpha-olefin, and the polyolefin-based block comprises the repeating unit derived from ethylene in an amount of 40 wt % to 60 wt % and the repeating unit derived from alpha-olefin in an amount of 10 wt % to 35 wt % based on the total weight of block copolymer composition.
3. The block copolymer composition of claim 1, wherein the polyolefin-based block comprises a repeating unit represented by Formula 1 below:

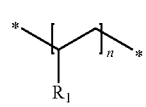

[Formula 1]

in Formula 1 above,
$R_1$ is hydrogen, alkyl having 1 to 20 carbon atoms, alkyl having 1 to 20 carbon atoms substituted with silyl, arylalkyl having 7 to 20 carbon atoms, or arylalkyl having 7 to 20 carbon atoms substituted with silyl, and
n is an integer of 10 to 10,000.
4. The block copolymer composition of claim 2, wherein the polyolefin-based block comprises a repeating unit represented by Formula 2 below:

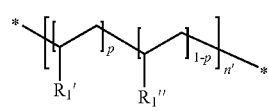

[Formula 2]

in Formula 2 above,
$R_1'$ and $R_1''$ are each independently hydrogen, alkyl having 1 to 20 carbon atoms, alkyl having 1 to 20 carbon atoms substituted with silyl, arylalkyl having 7 to 20 carbon atoms, or arylalkyl having 7 to 20 carbon atoms substituted with silyl, wherein $R_1'$ and $R_1''$ are different from each other,
0<p<1, and
n' is an integer of 10 to 10,000.
5. The block copolymer composition of claim 1, wherein the polystyrene-based block comprises a repeating unit represented by Formula 6 below and a repeating unit represented by Formula 9 below:

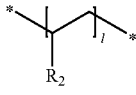
[Formula 6]

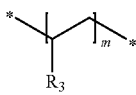
[Formula 9]

in the formulas above,
$R_2$ and $R_3$ are aryl having 6 to 20 carbon atoms, or aryl having 6 to 20 carbon atoms substituted with halogen, alkyl having 1 to 12 carbon atoms, cycloalkyl having 3 to 12 carbon atoms, alkoxy having 1 to 8 carbon atoms or aryl having 6 to 12 carbon atoms, and
l and m are each independently an integer of 10 to 1,000.

6. The block copolymer composition of claim 5, wherein $R_2$ and $R_3$ are each independently phenyl, or phenyl substituted or unsubstituted with halogen, alkyl having 1 to 8 carbon atoms, cycloalkyl having 3 to 12 carbon atoms, alkoxy having 1 to 8 carbon atoms or aryl having 6 to 12 carbon atoms.

7. The block copolymer composition of claim 1, wherein the triblock copolymer comprises a first block including one or more kinds of repeating units represented by Formula 1 below, a second block including a repeating unit represented by Formula 6 below, and a third block including a repeating unit represented by Formula 9 below:

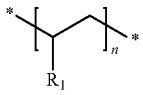
[Formula 1]

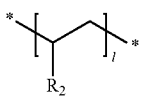
[Formula 6]

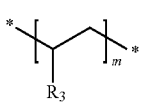
[Formula 9]

in the formulas above,
$R_1$ is hydrogen, alkyl having 1 to 20 carbon atoms, alkyl having 1 to 20 carbon atoms substituted with silyl, arylalkyl having 7 to 20 carbon atoms, or arylalkyl having 7 to 20 carbon atoms substituted with silyl,
$R_2$ and $R_3$ are aryl having 6 to 20 carbon atoms, or aryl having 6 to 20 carbon atoms substituted with halogen, alkyl having 1 to 12 carbon atoms, cycloalkyl having 3 to 12 carbon atoms, alkoxy having 1 to 8 carbon atoms or aryl having 6 to 12 carbon atoms,
n is an integer of 10 to 10,000, and
l and m are each independently an integer of 10 to 1,000.

8. The block copolymer composition of claim 7, comprising a composite block represented by Formula 8 below, the composite block formed by coupling the first block including a repeating unit of Formula 1 above and the second block including a repeating unit of Formula 6:

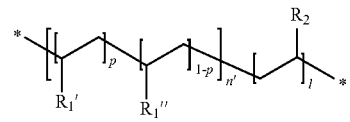
[Formula 8]

in Formula 8 above,
$R_1'$ and $R_1''$ are each independently hydrogen, alkyl having 1 to 20 carbon atoms, alkyl having 1 to 20 carbon atoms substituted with silyl, arylalkyl having 7 to 20 carbon atoms, or arylalkyl having 7 to 20 carbon atoms substituted with silyl, wherein $R_1'$ and $R_1''$ are different from each other,
$R_2$ is aryl having 6 to 20 carbon atoms, or aryl having 6 to 20 carbon atoms substituted with halogen, alkyl having 1 to 12 carbon atoms, cycloalkyl having 3 to 12 carbon atoms, alkoxy having 1 to 8 carbon atoms or aryl having 6 to 12 carbon atoms,
$0<p<1$,
n' is an integer of 10 to 10,000, and
l is an integer of 10 to 1,000.

9. The block copolymer composition of claim 7, comprising a structure represented by Formula 13 below:

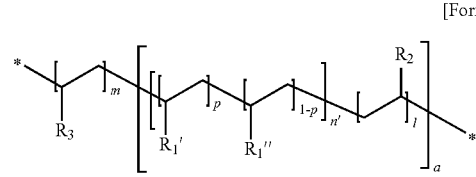
[Formula 13]

in Formula 13 above,
$R_1'$ and $R_1''$ are each independently hydrogen, alkyl having 1 to 20 carbon atoms, alkyl having 1 to 20 carbon atoms substituted with silyl, arylalkyl having 7 to 20 carbon atoms, or arylalkyl having 7 to 20 carbon atoms substituted with silyl, wherein $R_1'$ and $R_1''$ are different from each other,
$R_2$ and $R_3$ are each independently aryl having 6 to 20 carbon atoms, or aryl having 6 to 20 carbon atoms substituted with halogen, alkyl having 1 to 12 carbon atoms, cycloalkyl having 3 to 12 carbon atoms, alkoxy having 1 to 8 carbon atoms or aryl having 6 to 12 carbon atoms,
$0<p<1$,
n' is an integer of 10 to 10,000, and
l and m are each independently an integer of 10 to 1,000, and
a is an integer of 1 to 50.

10. The block copolymer composition of claim 1, comprising 19 wt % or less of the diblock copolymer.

11. The block copolymer composition of claim 1, wherein a polydispersity index (PDI) of 1.4 to 2.0.

12. The block copolymer composition of claim 1, wherein the block copolymer composition has a weight average molecular weight (Mw) thereof of 60,000 g/mol to 100,000 g/mol.

13. The block copolymer composition of claim 1, wherein ΔT is 55° C. to 70° C.

14. The block copolymer composition of claim 1, wherein ΔT is 57° C. to 65° C.

15. The block copolymer composition of claim 1, wherein the thermal decomposition termination temperature is 440°

C. to 470° C. and the thermal decomposition initiation temperature is 385° C. to 405° C.

* * * * *